United States Patent
Mutambi et al.

(10) Patent No.: US 9,512,318 B2
(45) Date of Patent: Dec. 6, 2016

(54) INORGANIC RED PIGMENT

(71) Applicant: BASF SE, Ludwigshafen (DE)

(72) Inventors: Emily M. Mutambi, Ludwigshafen (DE); Aron Wosylus, Bad Dürkheim (DE); Christof Kujat, Neustadt (DE); Petra Damm, Fankenthal (DE); Jürgen Oswald, Frankenthal (DE)

(73) Assignee: BASF SE (DE)

( * ) Notice: Subject to any disclaimer, the term of this patent is extended or adjusted under 35 U.S.C. 154(b) by 0 days.

(21) Appl. No.: 14/895,307

(22) PCT Filed: May 28, 2014

(86) PCT No.: PCT/IB2014/061785
§ 371 (c)(1),
(2) Date: Dec. 2, 2015

(87) PCT Pub. No.: WO2014/195829
PCT Pub. Date: Dec. 11, 2014

(65) Prior Publication Data
US 2016/0108247 A1    Apr. 21, 2016

(30) Foreign Application Priority Data
Jun. 3, 2013 (EP) .................................. 13170201

(51) Int. Cl.
*C09C 1/36* (2006.01)
*C01G 41/00* (2006.01)
*C09C 1/00* (2006.01)

(52) U.S. Cl.
CPC ............ *C09C 1/3607* (2013.01); *C01G 41/006* (2013.01); *C09C 1/0009* (2013.01); *C09C 1/0081* (2013.01); *C09C 1/36* (2013.01); *C01P 2006/62* (2013.01); *C01P 2006/65* (2013.01); *C01P 2006/66* (2013.01)

(58) Field of Classification Search
CPC ... C01G 41/006; C09C 1/009; C09C 1/0081; C09C 1/36; C09C 1/3607; C09C 1/008; C01P 2006/62; C01P 2006/65; C01P 2006/66
See application file for complete search history.

(56) References Cited

U.S. PATENT DOCUMENTS

| | | | |
|---|---|---|---|
| 3,853,573 A | 12/1974 | Ferrigno | |
| 4,063,956 A | 12/1977 | Higgins | |
| 4,448,608 A | 5/1984 | Jenkins et al. | |
| 4,851,049 A | 7/1989 | Wienand et al. | |
| 5,851,587 A | 12/1998 | Schittenhelm et al. | |
| 6,423,131 B1 | 7/2002 | Seeger et al. | |
| 7,416,601 B2 | 8/2008 | Erk et al. | |
| 7,837,781 B2 | 11/2010 | Mronga et al. | |
| 9,062,216 B2 | 6/2015 | Boocock et al. | |
| 2010/0050903 A1 | 3/2010 | Mronga et al. | |

FOREIGN PATENT DOCUMENTS

| | | |
|---|---|---|
| WO | WO-2005/078023 A2 | 8/2005 |
| WO | WO-2008083897 A2 | 7/2008 |
| WO | WO-2014/160218 A2 | 10/2014 |

OTHER PUBLICATIONS

International Search Report for PCT/IB2014/061785 mailed Feb. 26, 2015.

*Primary Examiner* — Anthony J Green
(74) *Attorney, Agent, or Firm* — Drinker Biddle & Reath LLP

(57) ABSTRACT

An inorganic red pigment is provided which pigment comprises titanium oxide, tin oxide, zinc oxide, and tungsten oxide, wherein the molar ratios of the oxides correspond to a composition of formula $$(TiO_2)_a(SnO_x)_b(ZnO)_c(WO_3)_d \quad (I),$$

wherein $SnO_x$ comprises SnO and $SnO_2$ in a molar ratio of $SnO:SnO_2$ of from 70:30 to 100:0; $0.8 \le a \le 3.0$; $0.3 \le b \le 2.0$; $0.3 \le c \le 1.3$; and $0.01 \le d \le 0.8$. Optionally, $SiO_2$, other metal oxides or metal sulfides may be present. The inorganic pigment may be used as colorant in various applications.

22 Claims, No Drawings

INORGANIC RED PIGMENT

CROSS-REFERENCE TO RELATED APPLICATIONS

This application is a national stage application (under 35 U.S.C.§371) of PCT/IB2014/061785, filed May 28, 2014, which claims benefit of European Application No. 13170201.1, filed Jun. 3, 2013, both of which are incorporated herein by reference in their entirety.

The present invention relates to a pigment based on Color Index (C.I.) Pigment Orange 82, especially a mixed metal oxide pigment based on titanium oxide, zinc oxide, tin oxide comprising tungsten oxide and optionally silica, other metal oxides and/or metal sulfides, a process for manufacturing the same and the use thereof as a colorant in various applications.

Lead chromate molybdate pigments are often used when red colorations are desired. However, the use of chromate-containing pigments and lead-containing pigments is decreasing due to environmental restrictions and requirements, and organic red pigments like diketopyrrolopyrrole pigments or azo pigments come into consideration in order to replace lead chromate pigments. Organic pigments, however, are often inferior in some performance properties like opacity and durability.

Pigments with reddish orange shades based on C.I. Pigment Orange 82 (titanium oxide, zinc oxide and tin oxide) are known. A commercially available pigment is, for example, Sicopal® Orange L 2430.

U.S. Pat. No. 4,448,608 discloses colorants with the composition $(TiO_2)_a(ZnO)_b(SnO)_c(SnO_2)_d$. The crystal structure of the pigments is unknown. Depending on the molar proportions of a, b, c, and d in the metal oxides, pigments of different colors are obtained ranging from yellow and orange hues to green, brown or gray hues. Preferred hues are orange and yellow. Critical for the color is the fraction of Sn(II) (as SnO) in the crystal. Preferred compositions for orange pigments are compositions wherein a=1 to 3, b=1, c=1, and d=0. As the amount of $SnO_2$ increases (d>0), the hue is shifted toward yellow. If the fraction of SnO is reduced, the pigments become increasingly lighter and weaker in color until ultimately a white or pale gray pigment results.

WO-A-2008/083897 discloses an inorganic pigment having the structure of formula $(TiO_2)_a(ZnO)_b(SnO)_c(SnO_2)_d(RE_xO_y)_3(AEO)_f(M_uO_v)_g$, wherein RE is preferably Y, La, Ce and Pr, AE is an alkaline earth metal, M is another metal and a=0.8-3; b=0.5-1.3; c=0.5-1.3; d=0-0.5; e=0-0.3; f=0-0.3 and g=0-0.1 and e+f≥0.1. The presence of elements RE and/or AE leads to a slight color shift toward yellow, as compared to pigments of $(TiO_2)_a(ZnO)_b(SnO)_c(SnO_2)_d$.

Hence, there is still a need for inorganic pigments which opens the color space to red colorations in order to have a suitable alternative for lead chromate molybdate pigments.

Therefore, it is an object of the present invention to provide an inorganic pigment exhibiting the desired coloristics like red colorations, high opacity and/or high chroma combined with outstanding performance properties like weather resistance in various applications.

An inorganic red pigment has been found which exhibits the desired performance characteristics of good weather resistance, chemical resistance and/or color properties.

Accordingly, in a first aspect the invention relates to a pigment comprising titanium oxide, tin oxide, zinc oxide and tungsten oxide, wherein the molar ratios of the oxides correspond to a composition of formula $$(TiO_2)_a(SnO)_b(ZnO)_c(WO_3)_d \qquad \text{(I), wherein}$$

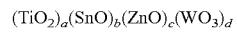

$SnO_x$ comprises SnO and $SnO_2$ in a molar ratio of $SnO:SnO_2$ of from 0.70:0.30 to 1.0:0;
0.8≤a≤3.0;
0.3≤b≤2.0;
0.3≤c≤1.3; and
0.01≤d≤0.8.

Preferably, the pigment is a pigment of formula (I), wherein 1.1≤a≤2.4; 0.5≤b≤1.5; 0.4≤c≤1.1; and 0.1≤d≤0.6; more preferably, wherein 1.3≤a≤2.1; 0.5≤b≤1.4; 0.4≤c≤1.1; and 0.1≤d≤0.5.

Optionally, the pigment comprises one or more oxides and/or sulfides. Accordingly, in a preferred aspect the invention relates to a pigment comprising titanium oxide, tin oxide, zinc oxide and tungsten oxide and optionally at least one oxide ($E_yO_z$) and/or sulfide, wherein the molar ratios of the oxides correspond to a composition of formula $$(TiO_2)_a(SnO)_b(ZnO)_c(WO_3)_d \qquad \text{(I), wherein}$$

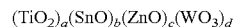

$SnO_x$ comprises SnO and $SnO_2$ in a molar ratio of $SnO:SnO_2$ of from 0.7:0.3 to 1:0;
0.8≤a≤3.0;
0.3≤b≤2.0;
0.3≤c≤1.3; and
0.01≤d≤0.8.

The optional oxide ($E_yO_z$) may be an oxide like $SiO_2$ or a metal oxide. Suitable metal oxides may be derived from alkali metals, alkaline earth metals, Al, Ga, In, Ge, Sb, Bi, or transition metals like Zr, Hf, V, Nb, Ta, Mo, Cr, Mn, Fe, Co, Ni, Cu, or rare earth metals like Y, La, Ce or Eu. Suitable examples of alkali metals are Na, K, Rb, and Cs, preferably K. Suitable examples of alkaline earth metals are Mg, Ca, Sr and Ba, preferably Ca and Ba. The optional sulfide may be a sulfide of Zn, Sn, E or a combination thereof.

Accordingly, the present invention preferably relates to a pigment of empirical composition of formula $$(TiO_2)_a(SnO_x)_b(ZnO)_c(WO_3)_d \qquad \text{(I) or of formula}$$

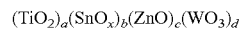

$$(TiO_2)_a(SnO_x)_b(ZnO)_c(WO_3)_d(E_yO_z) \qquad \text{(II), wherein}$$

$SnO_x$ comprises SnO and $SnO_2$ in a molar ratio of $SnO:SnO_2$ of from 0.7:0.3 to 1:0;
$E_yO_z$ is an oxide of an element selected Na, K, Rb, Cs, Mg, Ca, Sr, Ba, Al, Ga, In, Si, Ge, Sb, Bi, Zr, Hf, V, Nb, Ta, Mo, Cr, Mn, Fe, Co, Ni, Cu, Y, La, Ce, Eu or a combination thereof;
$SnO_x$ and/or ZnO may be partially replaced by the corresponding sulfide;
$E_yO_z$ may be partially or completely replaced by $E_yS_z$;
y varies from 1 to 2; z varies from 1 to 5;
0.8≤a≤3.0;
0.3≤b≤2.0;
0.3≤c≤1.3;
0.01≤d≤0.8; and
0≤e≤0.5.

Preferably, the pigment is a pigment of formula (II), wherein 1.1≤a≤2.4; 0.5≤b≤1.5; 0.4≤c≤1.1; 0.2≤d≤0.6; and 0≤e≤0.3.

$E_yO_z$ may be an oxide of an element selected from Na, K, Rb, Cs, Mg, Ca, Sr, Ba, Al, Ga, In, Si, Ge, Sb, Bi, Zr, Hf, V, Nb, Ta, Mo, Mn, Fe, Co, Ni, Cu, Y, La, Ce, Eu or a combination thereof. In a preferred embodiment, the pigment comprises a composition of formula (II), wherein $E_yO_z$ is an oxide of K, Mg, Ca, Sr, Ba, Al, Si, Bi, Mn, Nb, V, Ta or a combination thereof, preferably an oxide of K, Ca, Ba, Si, Mn, Nb, V or a combination thereof.

The pigment may comprise at least one sulfide. $SnO_x$ may be partially replaced by the corresponding sulfide $SnS_x$ in the pigment of formula (I) or (II). $SnS_x$ may comprise SnS and $SnS_2$ in a molar ratio of $SnS:SnS_2$ of from 0.7:0.3 to 1:0. The molar ratio of $SnO_x$ to $SnS_x$ may be in the range of from 2.0:0 to 1.5:0.5. Alternatively, ZnO may be partially replaced by ZnS in the pigment of formula (I) or (II). It is also possible that $SnO_x$ and ZnO are partially replaced. The molar ratio of ZnO to ZnS may be in the range of from 1.3:0 to 1.0:0.3.

A pigment of formula (II) is preferred, wherein ZnO is partially replaced by ZnS and the molar ratio of ZnO to ZnS is in the range of from 1.25:0.05 to 1.0:0.3.

Further, a pigment of formula (II) is preferred, wherein $SnO_x$ is partially replaced by $SnS_x$ and the molar ratio of $SnO_x$ to $SnS_x$ may be in the range of from 2.0:0.05 to 1.5:0.5.

Optionally, $E_yO_z$ may be partially or completely replaced in the pigment of formula (II) by the corresponding sulfide $E_yS_z$. $E_yS_z$ may be selected from K, Mg, Ca, Sr, Ba, Al, Bi, Mn, V, Nb or Ta, preferably from Ca, Ba or Mn. The molar ratio of $E_yO_z$ to $E_yS_z$ within formula (II) may be in the range of from 0.5:0 to 0:0.5, preferably 0.49:0.01 to 0.01:0.49. E in $E_yO_z$ and $E_yS_z$ may be the same or different within the pigment of formula (II).

Further, a pigment of formula (II) is preferred, wherein the pigment comprises a sulfide of Zn, Sn, Ca, Ba or Mn, preferably $E_yS_z$ is selected from ZnS, $SnS_x$, CaS, BaS, and/or MnS. Preferably, the pigment of the invention comprises only one kind of sulfide.

It is further preferred that the pigment of formula (II) does not comprise a sulfide.

Accordingly, the invention preferably relates to a pigment of empirical composition of formula

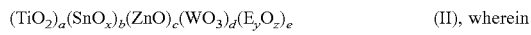

$(TiO_2)_a(SnO_x)_b(ZnO)_c(WO_3)_d(E_yO_z)_e$ (II), wherein $SnO_x$ comprises SnO and $SnO_2$ in a molar ratio of $SnO:SnO_2$ of from 0.7:0.3 to 1:0;
$E_yO_z$ is an oxide of K, Mg, Ca, Sr, Ba, Al, Si, Bi, Mn, Nb, V, Ta or a combination thereof;
$SnO_x$ and/or ZnO may be partially replaced by the corresponding sulfide;
$E_yO_z$ may be partially or completely replaced by CaS, BaS or MnS;
$0.8 \leq a \leq 3.0$;
$0.3 \leq b \leq 2.0$;
$0.3 \leq c \leq 1.3$;
$0.01 \leq d \leq 0.8$; and
$0.01 \leq e \leq 0.6$.

In case the pigment of the invention comprises $E_yS_z$, the pigment may comprise $E_yO_z$, wherein E is selected from Na, K, Rb, Cs, Mg, Ca, Sr, Ba, Al, Ga, In, Si, Ge, Sb, Bi, Zr, Hf, V, Nb, Ta, Mo, Cr, Mn, Fe, Co, Ni, Cu, Y, La, Ce, Eu or a combination thereof, and $E_yS_z$, wherein E is selected from Ca, Ba, Mn or a combination thereof. Preferably, the pigment of the invention may comprise $E_yO_z$, wherein E is selected from K, Mg, Ca, Sr, Ba, Al, Si, Bi, Mn, Nb, V, Ta or a combination thereof, and $E_yS_z$, wherein E is selected from Ca, Ba, or Mn. In case of complete replacement of $E_yO_z$, the pigment may only comprise $E_yS_z$ wherein E is selected from Ca, Ba, or Mn.

In a further preferred embodiment, the pigment comprises a composition of formula (II), wherein $E_yO_z$ is $K_2O$ and optionally an oxide of Mg, Ca, Sr, Ba, Al, Si, Bi, Mn, Nb, V, Ta or a combination thereof, preferably one oxide thereof.

An especially preferred pigment is a pigment of empirical composition of formula (II) wherein $E_yO_z$ is $K_2O$ and $SiO_2$.

In case that $E_yO_z$ is an oxide of K, Mg, Ca, Sr, Ba, Al, Si, Bi, Mn, Nb, V, Ta or a combination thereof, the pigment does preferably not comprise a sulfide. Alternatively preferred is a combination of one oxide of K, Mg, Ca, Sr, Ba, Al, Si, Bi, Mn, Nb, V or Ta and a sulfide of Sn, Zn, Ca, Ba, or Mn.

Preferred pigments of the invention are the following embodiments:
- pigments of formula (II), wherein e is 0; and the pigment does not comprise a sulfide;
- pigments of formula (II), wherein e is 0; and the pigment comprises ZnS as the only sulfide;
- pigments of formula (II), wherein e is 0; and the pigment comprises $SnS_x$ as the only sulfide;
- pigments of formula (II), wherein $E_yO_z$ is selected from one or two oxides of K, Mg, Ca, Sr, Ba, Al, Si, Bi, Mn, Nb, V or Ta; and $0.1 \leq e \leq 0.5$; and the pigment does not comprise a sulfide;
- pigments of formula (II), wherein $E_yO_z$ is completely replaced by $E_yS_z$ and E is selected from Ca, Ba, or Mn and $0.1 \leq e \leq 0.5$;
- pigments of formula (II), wherein $E_yO_z$ is selected from one or two oxides of K, Mg, Ca, Sr, Ba, Al, Si, Bi, Mn, Nb, V or Ta; and $0.1 \leq e \leq 0.5$; and the pigment comprises ZnS;
- pigments of formula (II), wherein only one kind of sulfide is present;
- pigments of formula (II), wherein $E_yO_z$ is selected from one oxides of K, Mg, Ca, Sr, Ba, Al, Si, Bi, Mn, Nb, V or Ta; and $0.1 \leq e \leq 0.5$; and the pigment comprises $E_yS_z$, wherein $E_yS_z$ is selected from CaS, BaS, or MnS.

The term "pigment of empirical composition of formula" and the term "pigment of formula" used herein are used equally. The variables a, b, c, d, e, f and g correspond to the molar ratios of the oxides and optional sulfides comprised in the pigment of the various formulae described within the pigments of the invention.

Preferred are pigments of formula (I) or (II), wherein the variables, if present in the pigment, are each independently from one another:
$1.1 \leq a \leq 2.4$; $0.5 \leq b \leq 1.5$; $0.4 \leq c \leq 1.1$; $0.1 \leq d \leq 0.6$; and $0 \leq e \leq 0.3$.

More preferred are pigments of formula (I) or (II), wherein the variables, if present in the pigment, are each independently from one another:
$1.3 \leq a \leq 2.1$; $0.5 \leq b \leq 1.4$; $0.4 \leq c \leq 1.1$; $0.1 \leq d \leq 0.6$; and $0 \leq e \leq 0.3$.

A pigment of formula (I) or (II) is preferred, wherein $0.01 \leq d \leq 0.6$, especially $0.1 \leq d \leq 0.5$, in particular $0.1 \leq d \leq 0.4$.

Further, a pigment of formula (II) is preferred, wherein c and e are each independently from one another: $0.4 \leq c \leq 0.7$; and $0.01 \leq e \leq 0.3$;

Within the pigments of the invention the metals and/or elements are generally present as ions balanced with the corresponding amount of anions, usually of oxides and/or sulfides. Usually, tungsten is present as $WO_3$. Optionally, minor amounts of other oxides may be present like $W_{10}O_{29}$, $W_4O_{11}$ and/or $WO_2$ in an amount up to 10 mol %, based on 1 mol $WO_3$, preferably up to 5 mol %, more preferably up to 98 mol %.

Within the pigments of the invention the element E, which may be selected from the group consisting of Na, K, Rb, Cs, Mg, Ca, Sr, Ba, Al, Ga, In, Si, Ge, Sb, Bi, Zr, Hf, V, Nb, Ta, Mo, Cr, Mn, Fe, Co, Ni, Cu, Y, La, Ce, and Eu, may occur as purely divalent oxides EO, purely trivalent oxides $E_2O_3$, purely tetravalent oxides $EO_2$, purely pentavalent oxides $E_2O_5$, or purely hexavalent oxides $EO_3$, and also as oxides with mixed oxidation states. For example, the divalent element E(II) may also comprise the trivalent E(III), or the trivalent E(III) may also comprise the tetravalent E(IV), or the tetravalent E(IV) may also comprise the pentavalent E(V). Consequently, the stoichiometric composition may vary between between EO and $E_2O_3$ and/or between $E_2O_3$ and $EO_2$ and/or between $EO_2$ and $E_2O_5$ and/or between $E_2O_5$ and $EO_3$. That is, for y is 1, z varies from 1 to 3. The same applies to the corresponding sulfides, if present.

The alkali metals are generally present in the pigment of the invention as E(I) oxides, the alkaline earth metals are generally present as E(II) oxides. Aluminum, gallium and indium are generally present as $Al_2O_3$, $Ga_2O_3$ and $In_2O_3$, respectively. Silicon and germanium are generally present as $SiO_2$ and $GeO_2$, respectively. Sb is generally present as Sb(V) and optionally in minor amounts as Sb(III). Bi is generally present Bi(III) and optionally in minor amounts of Bi(V).

Zirconium and hafnium are generally present as $ZrO_2$ and $HfO_2$, respectively. Manganese is generally present as MnO and optionally in minor amounts of $Mn_2O_3$, or $MnO_2$. Vanadium, niobium and tantalum are generally present as $V_2O_5$, $Nb_2O_5$ and $Ta_2O_5$, respectively and optionally in minor amounts of $VO_2$, $V_2O_3$, VO, NbO, $Nb_2O_3$, NbO, and $TaO_2$, resp. Chromium is generally present in $Cr_2O_3$ and optionally in minor amounts as CrO, $CrO_3$ and $CrO_2$. Molybdenum is generally present as Mo(VI) and optionally in minor amounts of Mo(II), (III) and/or Mo(IV). Iron is generally present as Fe(III) and optionally in minor amounts FeO and/or $Fe_3O_4$. Copper may be present as Cu(II) and optionally in minor amounts as Cu(I). Cobalt may be present as CoO and $Co_3O_4$. Nickel is generally present as NiO. Minor amount means up to 5 mol %, based on the 1 mol of the oxide which is mentioned as generally present.

The elements yttrium and lanthanum are generally present as $Y_2O_3$ and $La_2O_3$, respectively. Cerium is generally present as $CeO_2$. Europium is generally present as EuO.

The corresponding sulfides are generally present in the state as mentioned for the oxides, If present.

Preferably, $E_yO_z$ comprises within formula (II) oxides selected from $K_2O$, MgO, CaO, SrO, BaO, $Al_2O_3$, $SiO_2$, $Bi_2O_3$, MnO, $Nb_2O_5$, $V_2O_5$, $Ta_2O_5$ or a combination thereof.

In one preferred embodiment, the pigment consists essentially of titanium oxide, tin oxide, zinc oxide and tungsten oxide, wherein the molar ratios of the oxides correspond to the composition of formula

(TiO$_2$)$_a$(SnO$_x$)$_b$(ZnO)$_c$(WO$_3$)$_d$    (I), wherein

SnO$_x$ comprises SnO and SnO$_2$ in a molar ratio of SnO:SnO$_2$ of from 0.7:0.3 to 1:0;
0.8≤a≤3.0;
0.3≤b≤2.0;
0.3≤c≤1.3; and
0.01≤d≤0.8.

The term "consists essentially" used herein means that the total amount of titanium oxide, tin oxide, zinc oxide and tungsten oxide is ≥95% by weight, based on the total amount of the pigment. Further components may be present in an amount of ≤5% by weight, based on the total weight of the pigment, preferably ≤3% by weight. Further components may be $E_yO_z$, $E_yS_z$, ZnS, SnS$_x$ or other metals as doping materials in titanium oxide, tin oxide, zinc oxide or tungsten oxide.

The pigments of the invention usually comprises tin mainly as Sn(II) oxide and optionally as Sn(IV) oxide. Accordingly, SnO$_x$ (x varies from 1 to 2) comprises SnO and SnO$_2$, wherein the molar ratio of SnO:SnO$_2$ in SnO$_x$ is of from 0.70:0.30 to 1.0:0, preferably 0.75:0.25 to 0.98:0.02, more preferably 0.75:0.25 to 0.95:0.05, most preferably 0.80:0.20 to 0.90:0.10. An amount of SnO$_2$ up to 30 mol % may be present when an oxidizing atmosphere or small amounts of oxygen is present during the production process. SnO$_2$ may also be added in the process of the invention, for example up to 30 mol %, based on 1 mol of SnO. The same applies to SnS$_2$.

The pigments of the invention may also comprise one or more coating layers. The layer is preferably a transparent layer. The layer may be inorganic and/or organic. A preferred layer is, for example, an inorganic coating selected from $SiO_2$, $TiO_2$, $Fe_3O_4$, $Al_2O_3$, $Bi_2O_3$ or a combination thereof. A preferred coating is based on $SiO_2$. It is also possible to have more layers based on $SiO_2$. Usually, $SiO_2$ may be present in an amount of at least 2% of weight, preferably 2 to 10% by weight, based on the total weight of the coated pigment. A coating of organopolysiloxane or a wax may also be used, for example dimethylpolysiloxane. Alternatively, an internal $SiO_2$ layer and an external organopolysiloxane layer may be used.

The pigments of the invention may be prepared in accordance of the procedure described in WO-A-2008/083897. The oxidic raw materials $TiO_2$, SnO, ZnO, WO$_3$ and, if appropriate, SnO$_2$, $E_yO_z$ or precursors of any of these materials are mixed in the form of dry powders. Optionally, corresponding sulfides or precursors thereof may be added and mixed. The mixture is calcined at temperatures between 600 and 950° C. Calcining may be done in an inert gas atmosphere like nitrogen or argon atmosphere, or in a reducing atmosphere like ammonia or carbon monoxide, or in an oxidizing atmosphere like steam. The resulting furnace clinker is ground, and the resulting particles are optionally coated.

As a result of the dry synthesis, composed of the individual steps of mixing all of the raw materials, calcining the raw mixture, and subsequent conventional grinding (wet grinding or dry grinding) it is possible to produce the pigments of the invention even on the industrial scale without abnormal cost or inconvenience.

Instead of oxides of the stated elements it is also possible to employ oxide precursors which are transformed into oxides by heating. Examples of such precursors may be hydroxides, carbonates, oxide hydrates, and basic carbonates of the stated elements. Suitable precursors for sulfides may be the corresponding sulfates.

In a further aspect of the invention a process for producing the pigments of the invention is provided.

Accordingly, the invention is directed to a process for producing a pigment as defined in any aspect herein-before, which process comprises the steps of
a) mixing $TiO_2$, ZnO, SnO, WO$_3$ or a precursor compound thereof as a dry powder to form a powder mixture;
b) calcining the powder mixture at a temperature of from 600 to 950° C. to form a furnace clinker;
c) grinding the furnace clinker to form pigment particles; and
d) optionally coating the pigment particles with at least one layer.

Optional oxides or sulfides may be added in the mixing step a). At least one compound selected from $E_yO_z$, SnO$_2$, SnS, ZnS or $E_yS_z$, or a precursor compound thereof may be added and mixed as a dry powder.

Calcining may be done under an inert gas atmosphere or reducing atmosphere or oxidizing atmosphere. Preferably, the calcining step may be performed under inert gas atmosphere. The calcining temperature is preferably of from 700 to 875° C. or 750 to 875° C. After calcining the furnace clinker is cooled, for example, under inert gas. The furnace clinker is preferably ground by wet milling.

Preferably, $H_2WO_4$ is used as starting material to form $WO_3$. Optionally, $TiO_2$ doped with W can also be employed to form $WO_3$ in the instant pigments. Further, $H_2WO_4$ and $TiO_2$ doped with W may be used in combination. $TiO_2$ may be used as rutile or anatase modification.

The optional coating step d) may be carried out by methods known in the art, for example as described in U.S. Pat. No. 4,851,049, U.S. Pat. No. 4,063,956, U.S. Pat. No. 6,423,131 or U.S. Pat. No. 5,851,587. The coating may be prepared by precipitating a $SiO_2$-containing layer onto the pigment particles in an aqueous suspension at an elevated temperature of about 70 to 100° C. from an aqueous alkali metal silicate solution. The coating may be carried out with ground particles obtained in step c) or may be done under wet grinding conditions.

In a further aspect, the invention relates to a pigment obtainable by the process as defined herein-before. Accordingly, the invention relates to a pigment obtainable by a process for producing a pigment as defined hereinbefore in formula (I) or (II), which process comprises
a) mixing $TiO_2$, ZnO, SnO, $WO_3$, or a precursor compound thereof, and optionally at least one compound selected from $E_yO_z$, SnS, ZnS or $E_yS_z$, or a precursor compound thereof as a dry powder to form a powder mixture;
b) calcining the powder mixture at a temperature of from 600 to 950° C. to form a furnace clinker;
c) grinding the furnace clinker to form pigment particles; and
d) optionally coating the pigment particles with at least one layer.

The particle size of the instant pigments may be of from 0.5 to 3 µm, preferably 0.6 to 2.0 µm. The particle size may be measured according to DIN 13320.

An alternative possibility is to produce the pigments of the invention by dissolving the salts of the elements titanium, tin, zinc, tungsten and optionally E in water with addition of an acid or a base in a non-oxidizing, inert atmosphere (e.g., nitrogen or argon atmosphere), precipitating the hydroxides or oxide hydrates of titanium, tin, zinc, tungsten and optionally E by addition of aqueous alkali metal hydroxide solution, heating to a temperature below the melting point of alkali metal hydroxides, filtering, washing, drying, and calcining at a temperature of from 750 to 950° C. in an inert gas atmosphere. The stated elements are preferably dissolved in the form of their chlorides or nitrates.

The pigments of the invention may be employed diversely as colorants. Preferred fields of use of the pigments are as colorants for coloring paints, printing inks, liquid inks, plastics, rubber, fibers, films and cosmetic formulations. Paints are aqueous or solvent-borne coating materials and also powder coating materials, in which the pigments of the invention may be employed alone or in combination with extenders, white pigments, chromatic pigments or black pigments. Binders that may be used include all of the binders that are usual in the coatings sector. Examples of coating materials which may be colored with the pigments of the invention include more particularly:

oil-based coating materials (based on linseed oil or polyurethane oils),
cellulose-based coating materials (NC, CAB, CAP),
coating materials based on chlorinated rubber,
vinyl coating materials (based on PVC, PVDF, VC copolymer, polyvinyl acetate, polyvinyl ester dispersion, polyvinyl alcohol, polyvinyl acetal, polyvinyl ether, polystyrene, styrene copolymers),
acrylate coating materials,
alkyd coating materials,
saturated polyester coating materials,
unsaturated polyester coating materials,
polyurethane coating materials (one pack, two pack),
epoxy coating materials,
silicone coating materials,
silicate coating materials (based on waterglass, alkyl silicates).

These coating systems are described in detail in D. Stoye, W. Freitag, Paints, Coatings and Solvents, Second Edition, 1998, Wiley-VCH.

Combinations with effect pigments are also possible and lead to special effects. Effect pigments include platelet-shaped metallic and/or oxidic effect pigments.

The pigments of the invention may also be used with advantage to color customary plastics and blends of plastics, either as pigments alone or in combination with white, chromatic, and black pigments, and in combination with all typical additives and stabilizers. Suitable plastics include unplasticized and plasticized PVC, polyolefins, and also all engineering plastics such as ABS, polystyrene, polyamide, polyester, polycarbonate, polyetherketone, and also polyurethanes and rubber systems. The pigments can be incorporated by means of typical mixing, blending, kneading and extrusion techniques. The pigments are chemically inert and highly weather- and temperature-resistant, so making them equally suitable for interior and exterior applications.

The pigments of the invention exhibit high reflectivity in the near infrared region and hence can be used with advantage, alone or in a mixture with further suitable pigments and extenders, in those paint materials or plastics particles which under insulation are intended to limit the heating-up of interior spaces (e.g., of buildings and vehicles).

The following pigments are suitable for mixtures with white pigments:
C.I. Pigment White 4, 5, 6 and 7.

The following pigments are suitable for mixtures with black pigments:
C.I. Pigment Black 6, 7, 11, 26, 27, 28, 29, 30, and 32; or perylene pigments disclosed in WO 2005/078023 A2;
C.I. Pigment Brown 29 and 35, The following pigments are suitable for mixtures with inorganic chromatic pigments:
C.I. Yellow 42, 34, 53, 161, 162, 163, 164, 184 and 189;
C.I. Brown 24 and 37;
C.I. Pigment Red 101 and 104;
C.I. Pigment Blue 28 and 36;
C.I. Pigment Green 17 and 50.

Organic chromatic pigments suitable for mixtures include, for example, pigments selected from the group consisting of monoazo, disazo, disazo condensation, anthanthrone, anthraquinone, anthrapyrimidine, quinacridone, quinophthalone, diketopyrrolopyrrole, dithioketopyrrolopyrrole, dioxazine, flavanthrone, indanthrone, isoindoline, isoindolinone, isoviolanthrone, perinone, perylene, phthalocyanine, pyranthrone, pyrazoloquinazolone, indigo, thioindigo, triarylcarbonium pigments and combinations thereof.

Suitable examples include the following:
Phthalocyanine pigments: C.I. Pigment Blue 15, 15:1, 15:2, 15:3, 15:4, 15:6, 16,
C.I. Pigment Green 7, 36;
Indanthrone pigments: C.I. Pigment Blue 60;
Anthrapyrimidine pigments: C.I. Pigment Yellow 108;

Dioxazine pigments: C.I. Pigment Violet 23;
Quinacridone pigments: C.I. Pigment Red 122 and 202, C.I. Pigment Violet 19;
Perylene pigments: C.I. Pigment Red 123, 178, 179 and 224;
Pyrazoloquinazolone pigments: C.I. Pigment Orange 67 and C.I. Pigment Red 216;
Isoindoline pigments: C.I. Pigment Yellow 139 and 185, C.I. Pigment Orange 61 and 69, C.I. Pigment Red 257 and 260;
Isoindolinone pigments: C.I. Pigment Yellow 109, 110 and 173;
Azo pigments: C.I. Pigment Yellow 2, 13, 62, 74, 83, 151, 154, 168 and 191,
C.I. Pigment Orange 5, 13, 34, 36, 64 and 67,
C.I. Pigment Red 1, 2, 3, 4, 5, 23, 48:1, 48:2, 48:3, 48:4, 49, 49:1, 51, 51:1, 53, 53:1, 57:1, 58:2, 58:4, 112, 144, 146, 148, 166, 170, 184, 214, 220, 221 and 251;
Diketopyrrolopyrrole pigments: C.I. Pigment Orange 71 and 73,
C.I. Pigment Red 254, 255, 264 and 272;
Quinophthalone pigments: C.I. Pigment Yellow 138 and 108;
Anthraquinone pigments: C.I. Pigment Red 177.

The pigment mixtures comprise 10% to 99% by weight of the further organic and/or inorganic pigments and 1% to 90% by weight of the pigments of the invention, based on the total weight of pigments.

Examples of suitable platelet-shaped pigments include the following:

Metal pigments: aluminum pigments, steel pigments, zinc pigments;

Coated metal pigments:
  iron oxide-coated aluminum pigments, titanium dioxide-coated aluminum pigments, iron oxide/titanium oxide-coated aluminum pigments, aluminum oxide-coated aluminum pigments, aluminum oxide/iron oxide-coated aluminum pigments, silicon oxide-coated aluminum pigments, silicon suboxide-coated aluminum pigments, silicon oxide/iron oxide-coated aluminum pigments, magnesium fluoride/chromium-coated aluminum pigments;

Coated oxidic pigments:
  titanium oxide-coated mica pigments, iron oxide-coated mica pigments, titanium oxide/iron oxide-coated mica pigments, titanium oxide-coated aluminum oxide pigments, iron oxide-coated aluminum oxide pigments, titanium oxide/iron oxide-coated aluminum oxide pigments, titanium oxide-coated glass pigments, iron oxide-coated glass pigments, titanium oxide/iron oxide-coated glass pigments, titanium oxide-coated $SiO_2$ pigments, iron oxide-coated $SiO_2$ pigments, titanium oxide/iron oxide-coated $SiO_2$ pigments, iron oxide/silicon oxide-coated mica pigments, titanium oxide/silicon oxide-coated mica pigments,
  iron oxide/silicon oxide-coated glass pigments, titanium oxide/silicon oxide-coated glass pigments, iron oxide/silicon oxide-coated aluminum oxide pigments, titanium oxide/silicon oxide-coated aluminum oxide pigments, titanium oxide-coated mica pigments further coated with organic dyes and/or organic pigments, and iron oxide-coated mica pigments further coated with organic dyes and/or organic pigments;

Bismuth oxychloride pigments;
Platelet-shaped iron oxide pigments.

The pigment mixtures comprise 10% to 99% by weight of the platelet-shaped pigments and 1% to 90% by weight of the pigments of the invention, based on the total weight of pigments.

Accordingly, the invention relates to a pigment mixture comprising
a) 1% to 90% by weight of a pigment as defined in any aspect herein-before, and
b) 10% to 99% by weight of one or more further pigments selected from the group consisting of an organic pigment, an inorganic pigment and an effect pigment.

In a further aspect, the invention relates to the use of the pigment as defined in any aspect herein-before or the pigment mixture as defined herein-before for coloring paints, printing inks, liquid inks, cosmetics, plastics, films, fibers, glazes for ceramics and glass.

In a further aspect, the invention relates to paints, printing inks, liquid inks, cosmetics, plastics, films, fibers, glazes for ceramics and glass, which are colored with a pigment as defined in any aspect herein-before or the pigment mixture as defined herein-before.

The pigments of the invention exhibit a red coloration which is comparable to colorations currently available with lead chromate molybdate pigments. That is, a suitable and environmental-friendly replacement may be provided. The pigments of the invention incorporated in a mass tone paste (40% by weight of dinonyl phthalate and 60% by weight of PVC, as described in the Examples) are characterized by a hue of less than 57, preferably less than 51 (measured according to the CIELAB system). The presence of $WO_3$ within the pigments of the invention leads to noticeably more red pigments compared to the pigments of WO-A-2008/083897.

Moreover, the pigments of the invention have high opacity and high chroma combined with outstanding performance properties like excellent weather resistance and light stability. The pigments are more stable than lead chromate molybdate pigments with regard to light stability, heat stability, weather resistance, acid and alkali stability. The present invention yields strongly colored pigments of high brilliance.

The definitions and preferences given for the pigment mentioned herein-before apply in any combination as well as in any combination for the other aspects of the invention.

The present invention will now be explained in more detail with reference to the following examples. However, the following examples are provided for illustrative purposes only, and the scope of the present invention should not be limited thereto in any manner. Unless otherwise stated, "%" is always % by weight.

EXAMPLES

The pigments are produced using commercially available metal oxides or corresponding precursors. The molar ratios mentioned in the formulae of the Examples correspond to the molar ratios employed in the process.

General Description of the Preparation of the Pigments

The pigments are synthesized in a rotating quartz flask with a capacity of 500 ml, located within an electrically heated clamshell furnace. After the crude pigment mixture has been introduced, the flask is sealed with a stopper which has openings for a gas supply tube and a gas removal tube and also for a thermocouple. The thermocouple regulates the temperature of the clamshell furnace. Through the gas introduction tube a stream of nitrogen is passed through the flask at a constant metering rate of 20 l/h (srtp). The contents of the quartz flask are rendered inert with nitrogen for half an hour, during which the flask is rotated, and then heating takes place at 800° C. over the course of 1 hour, and this temperature is maintained for 1 hour. Subsequently, under nitrogen atmosphere, the flask is cooled to room temperature (20-25° C.). The calcined pigment (furnace clinker) is subsequently ground.

For grinding, a porcelain mortar with a capacity of 500 ml is charged with 30 g of mixed furnace clinker together with 60 g of drinking water and 250 g of glass grinding beads (2 mm in diameter) and grinding is carried out for 10 minutes at 400 revolutions in a vibratory mill (from Retsch). The grinding beads are separated from the pigment suspension by sieving. The suspension is filtered, followed by washing (3×), drying at 160° C. in a forced-air drying oven for 1 hour and subjecting to deagglomeration for 15 sec in a Braun mixer.

For assessment of the coloristic properties of the pigments, pigment dispersions in PVC plastisol paste are prepared which are cured by 15-minute heating at 160° C. in a forced-air drying oven. After the curing procedure, the pigmented plastisol is subjected to colorimetry using an Optronic Multiflash spectrophotometer. The pigments are measured in masstone (chromatic pigment only) for hue h, chroma C* and lightness L*, and in white reduction, consisting of 1 part of chromatic pigment+3 parts of rutile Kronos 1001 (corresponding to a reduction of 1:4, for color equivalents (CE)).

Preparation of a Mass Tone Paste

Composition of the plastisol: 40 parts by weight dinonyl phthalate (Palatinol® N) and 60 parts by weight PVC (Vestolit® 7012).

0.6 g of chromatic pigment are dispersed with 6 g of plastisol on a JEL 25.86 plate-type muller (from Engelsmann) with 100 revolutions under a weight of 50 kg. The resulting chromatic pigment paste is applied in a film thickness of 800 μm to a glass plate by means of a flat coating bar in a film coating apparatus (from Erichsen) and is cured after a short flash-off time in a forced-air drying oven at 160° C. for 15 minutes.

After cooling, the drawdowns, still lying on the glass plate, are subjected to colorimetry on the side facing away from the glass, using the multiflash spectrophotometer (from Optronic), and the color strength and CIELab color values L* (lightness), C* (chroma, i.e., cleanness of color) and h* (hue) are calculated using the BCSWIN program (BASF Color System). Evaluation takes place on the data obtained at a measurement angle of 45°.

Example 1

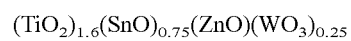

$(TiO_2)_{1.6}(SnO)_{0.75}(ZnO)(WO_3)_{0.25}$ 22.30 g of $TiO_2$, 17.63 g of SnO, 1.87 g of $H_2WO_4$, and 14.20 g of ZnO are weighed into a beaker, well premixed with a spatula, and then transferred into a 250 ml plastic bottle filled with 250 g of steatite beads (diameter: 10 mm). The premixed material is mixed in dry form in an intensive mixer (Skandex) for 2 minutes. The crude mixture is transferred to a quartz flask, heated to 800° C. under nitrogen atmosphere (20 l/h) within 1 hour and then calcined for 1 hour. The furnace clinker is ground as described above in a porcelain vibratory mill. After drying and deagglomeration, the plastisol pigmentations are prepared and subjected to colorimetry. Coloristic measurement of the obtained pigments gives the following values:

TABLE 1

| Molar ratio | | | | White reduction | Mass tone | | |
|---|---|---|---|---|---|---|---|
| TiO₂ | SnO | ZnO | WO₃ | CE | h* | C* | L* |
| 1.6 | 0.75 | 1 | 0.25 | 155 | 48.28 | 62.07 | 42.87 |

Example 2

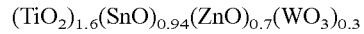

$(TiO_2)_{1.6}(SnO)_{0.94}(ZnO)_{0.7}(WO_3)_{0.3}$

The procedure of Example 1 is repeated with the amounts of the raw materials given in Table 2, where also the results of the coloristic tests are shown.

TABLE 2

| Initial mass (g) | | | | Molar ratio | | | | Mass tone | | |
|---|---|---|---|---|---|---|---|---|---|---|
| TiO₂ | SnO | ZnO | H₂WO₄ | TiO₂ | SnO | ZnO | WO₃ | h* | C* | L* |
| 19.85 | 19.66 | 8.84 | 11.64 | 1.6 | 0.94 | 0.7 | 0.3 | 49.79 | 65.5 | 42.09 |

Preparation of a White Reduction Paste 0.15 g of chromatic pigment and 0.45 g of rutile pigment are dispersed with 6 g of plastisol on an Engelsmann JEL 25.86 plate-type muller with 150 revolutions under a weight of 70 kg. The chromatic pigment/white paste that results is applied in a film thickness of 800 μm to a glass plate by means of a flat coating bar in a film coating apparatus (from Erichsen) and is cured after a short flash-off time in a forced-air drying oven at 160° C. for 15 minutes.

Example 3

$(TiO_2)_{1.6}(SnO)_{0.94}(ZnO)_{0.5}(ZnS)_{0.1}(WO)_{0.4}$

The procedure of Example 1 is repeated with the amounts of raw materials given in Table 3 (ZnO is partially replaced by ZnS). Table 3 further shows the results of the coloristic tests of the obtained pigment.

TABLE 3

| Initial mass (g) | | | | | Molar ratio | | | | | Mass tone | | |
|---|---|---|---|---|---|---|---|---|---|---|---|---|
| $TiO_2$ | SnO | ZnO | ZnS | $H_2WO_4$ | $TiO_2$ | SnO | ZnO | ZnS | $WO_3$ | h* | C* | L* |
| 18.95 | 18.77 | 6.03 | 1.44 | 14.81 | 1.6 | 0.94 | 0.5 | 0.1 | 0.4 | 49.65 | 61.59 | 41.06 |

Example 4

$(TiO_2)_{1.6}(SnO)_{0.94}(ZnO)_{0.5}(ZnS)_{0.2}(WO_3)_{0.3}$

The procedure of Example 1 is repeated with the amounts of raw materials given in Table 4 (ZnO is partially replaced by ZnS). Table 4 further shows the results of the coloristic tests of the obtained pigment.

TABLE 4

| Initial mass (g) | | | | | Molar ratio | | | | | Mass tone | | |
|---|---|---|---|---|---|---|---|---|---|---|---|---|
| $TiO_2$ | SnO | ZnO | ZnS | $H_2WO_4$ | $TiO_2$ | SnO | ZnO | ZnS | $WO_3$ | h* | C* | L* |
| 19.69 | 19.50 | 6.27 | 3.0 | 11.54 | 1.6 | 0.94 | 0.5 | 0.2 | 0.3 | 50.55 | 64.8 | 42.87 |

Example 5

$(TiO_2)_{1.6}(SnO)_{0.94}(ZnO)_{0.5}(WO_3)_{0.2}(MnO)_{0.3}$

The procedure of Example 1 is repeated with the amounts of metal salts given in Table (ZnO is partially replaced by MnO). Table 5 further shows the results of the coloristic tests of the obtained pigment.

TABLE 5

| Initial mass (g) | | | | | Molar ratio | | | | | Mass tone | | |
|---|---|---|---|---|---|---|---|---|---|---|---|---|
| $TiO_2$ | SnO | ZnO | $H_2WO_4$ | $MnCO_3$ | $TiO_2$ | SnO | ZnO | $WO_3$ | MnO | h* | C* | L* |
| 20.21 | 20.01 | 6.43 | 7.90 | 5.45 | 1.6 | 0.94 | 0.5 | 0.2 | 0.3 | 56.77 | 66.98 | 48.18 |

Example 6

$(TiO_2)_{1.6}(SnO)_{0.94}(ZnO)_{0.7}(WO_3)_{0.3}$ 19.85 g of $TiO_2$, 19.66 g of SnO, 11.64 g of $H_2WO_4$, and 8.84 g of ZnO are weighed into a beaker, well premixed with a spatula, then transferred into a 250 ml plastic bottle filled with 250 g of steatite beads (diameter: 9 mm). The premixed material is then mixed in dry form in an intensive mixer (Skandex) for 2 minutes. The crude mixture is transferred to a quartz flask, heated to 820° C. under nitrogen atmosphere (20 l/h) within 1 hour and then calcined for 2 hours. The furnace clinker is ground as described above in a porcelain vibratory mill. After drying and deagglomeration, the plastisol pigmentations are prepared and subjected to colorimetry. Colorimetric measurement of the obtained pigment gives the following values:

TABLE 6

| Initial mass (g) | | | | Molar ratio | | | | Mass tone | | |
|---|---|---|---|---|---|---|---|---|---|---|
| $TiO_2$ | SnO | ZnO | $H_2WO_4$ | $TiO_2$ | SnO | ZnO | $WO_3$ | h* | C* | L* |
| 19.85 | 19.66 | 8.84 | 11.64 | 1.6 | 0.94 | 0.7 | 0.3 | 49.1 | 63.3 | 41.24 |

Example 7

$(TiO_2)_{1.6}(SnO)_{0.74}(ZnO)(WO_3)_{0.23}$

The procedure of Example 1 is repeated with the amounts of components given in Table 7 ($TiO_2$ doped with 5 mol % of W is used in addition to $H_2WO_4$). Table 7 further shows the results of the coloristic tests of the obtained pigment.

TABLE 7

| | Initial mass (g) | | | | Molar ratio | | | | Mass tone | | |
|---|---|---|---|---|---|---|---|---|---|---|---|
| TiO$_2$ doped with W | SnO | ZnO | H$_2$WO$_4$ | TiO$_2$ | SnO | ZnO | WO$_3$ | h* | C* | L* |
| 24.82 | 17.42 | 14.22 | 6.54 | 1.6 | 0.74 | 1 | 0.23 | 47.6 | 61.35 | 42.65 |

Example 8

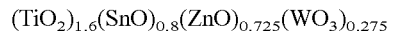

21.75 g of TiO$_2$, 21.55 g of SnO, 11.67 g of H$_2$WO$_4$, and 10.04 g of ZnO are weighed into a beaker, well premixed with a spatula and then transferred into a 250 ml plastic bottle filled with 250 g of steatite beads (diameter: 9 mm). The premixed material is then mixed in dry form in an intensive mixer (Skandex) for 2 minutes. The crude mixture is transferred to a quartz flask, heated to 810° C. under nitrogen atmosphere (20 l/h) within 1 hour and then calcined for 1 hour. The furnace clinker is ground as described above in a porcelain vibratory mill. Table 8 shows the amounts of the raw materials employed and the results of the coloristic tests of the obtained pigment.

TABLE 8

| Initial mass (g) | | | | Molar ratio | | | | Mass tone | | |
|---|---|---|---|---|---|---|---|---|---|---|
| TiO$_2$ | SnO | ZnO | H$_2$WO$_4$ | TiO$_2$ | SnO | ZnO | WO$_3$ | h* | C* | L* |
| 21.75 | 21.55 | 10.04 | 11.67 | 1.6 | 0.94 | 0.725 | 0.275 | 50.96 | 67.15 | 43.92 |

Example 9

$(TiO_2)_{1.6}(SnO)_{0.8}(ZnO)_{0.725}(WO_3)_{0.275}$

The procedure of Example is repeated with the amounts of raw materials given in Table 9, where also the results of the coloristic tests of the obtained pigment are shown.

TABLE 9

| Initial mass (g) | | | | Molar ratio | | | | Mass tone | | |
|---|---|---|---|---|---|---|---|---|---|---|
| TiO$_2$ | SnO | ZnO | H$_2$WO$_4$ | TiO$_2$ | SnO | ZnO | WO$_3$ | h* | C* | L* |
| 22.88 | 19.29 | 10.56 | 12.27 | 1.6 | 0.80 | 0.725 | 0.275 | 48.07 | 56.95 | 40.42 |

Example 10

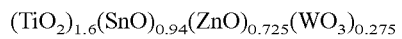

21.75 g of TiO$_2$, 21.55 g of SnO, 11.67 g of H$_2$WO$_4$, and 10.04 g of ZnO are weighed into a beaker, well premixed with a spatula, then transferred into a 250 ml plastic bottle filled with 250 g of steatite beads (diameter: 9 mm). The premixed material is then mixed in dry form in an intensive mixer (Skandex) for 2 minutes. The crude mixture is transferred to a quartz flask, heated to 820° C. under nitrogen atmosphere (20 l/h) within 1 hour and then calcined for 1 hour. The furnace clinker is ground as described above in a porcelain vibratory mill. After drying and deagglomeration, the plastisol pigmentations are prepared and subjected to colorimetry. Table 10 shows the amounts of the raw materials employed and the results of the coloristic tests of the obtained pigment.

TABLE 10

| Initial mass (g) | | | | Molar ratio | | | | Mass tone | | |
|---|---|---|---|---|---|---|---|---|---|---|
| TiO$_2$ | SnO | ZnO | H$_2$WO$_4$ | TiO$_2$ | SnO | ZnO | WO$_3$ | h* | C* | L* |
| 21.75 | 21.55 | 10.04 | 11.67 | 1.6 | 0.94 | 0.725 | 0.275 | 50.27 | 66.21 | 43.41 |

Example 11

$(TiO_2)_{1.6}(SnO)_{1.1}(ZnO)_{0.725}(WO_3)_{0.275}$ 20.59 g of $TiO_2$, 23.87 g of SnO, 11.04 g of $H_2WO_4$, and 9.50 g of ZnO are weighed into a beaker, well premixed with a spatula, then transferred into a 250 ml plastic bottle filled with 250 g of steatite beads (diameter 9 mm). The premixed material is then mixed in dry form in an intensive mixer (Skandex) for 2 minutes. The crude mixture is transferred to a quartz flask, heated to 810° C. under nitrogen (20 l/h) within 1 hour and then calcined for 1 hour. The furnace clinker is ground as described above in a porcelain vibratory mill. After drying and deagglomeration, the plastisol pigmentations are prepared and subjected to colorimetry. Table 11 shows the amounts of the raw materials employed and the results of the coloristic tests.

TABLE 11

| Initial mass (g) | | | | Molar ratio | | | | Mass tone | | |
|---|---|---|---|---|---|---|---|---|---|---|
| $TiO_2$ | SnO | ZnO | $H_2WO_4$ | $TiO_2$ | SnO | ZnO | $WO_3$ | h* | C* | L* |
| 20.59 | 23.87 | 9.50 | 11.04 | 1.6 | 1.1 | 0.725 | 0.275 | 53.47 | 72.43 | 46.18 |

Example 12

$(TiO_2)_{1.4}(SnO)_{0.75}(ZnO)(WO_3)_{0.25}$

The procedure of Example 1 is repeated with the amounts of raw materials given in Table 12, where also the results of the coloristic tests of the obtained pigment are shown.

TABLE 12

| Initial mass (g) | | | | Molar ratio | | | | Mass tone | | |
|---|---|---|---|---|---|---|---|---|---|---|
| $TiO_2$ | SnO | ZnO | $H_2WO_4$ | $TiO_2$ | SnO | ZnO | $WO_3$ | h* | C* | L* |
| 22.30 | 17.63 | 14.83 | 11.36 | 1.4 | 0.75 | 1 | 0.25 | 47.92 | 62.42 | 42.17 |

Example 13

$(TiO_2)_{1.8}(SnO)_{0.75}(ZnO)(WO_3)_{0.25}$

The procedure of Example 1 is repeated with the amounts of raw materials given in Table 13, where also the results of the coloristic tests of the obtained pigment are shown.

TABLE 13

| Initial mass (g) | | | | Molar ratio | | | | Mass tone | | |
|---|---|---|---|---|---|---|---|---|---|---|
| $TiO_2$ | SnO | ZnO | $H_2WO_4$ | $TiO_2$ | SnO | ZnO | $WO_3$ | h* | C* | L* |
| 24.11 | 16.94 | 13.61 | 10.34 | 1.8 | 0.75 | 1 | 0.25 | 48.14 | 60.31 | 43.1 |

Example 14

$(TiO_2)_{1.6}(SnO)_{0.665}(ZnO)(WO_3)_{0.275}$

The procedure of Example 1 is repeated with the amounts of raw materials given in Table 14, where also the results of the coloristic tests of the obtained pigment are shown.

TABLE 14

| Initial mass (g) | | | | Molar ratio | | | | Mass tone | | |
|---|---|---|---|---|---|---|---|---|---|---|
| $TiO_2$ | SnO | ZnO | $H_2WO_4$ | $TiO_2$ | SnO | ZnO | $WO_3$ | h* | C* | L* |
| 22.62 | 15.85 | 14.40 | 12.13 | 1.6 | 0.665 | 1 | 0.275 | 47.2 | 58.36 | 42.39 |

Example 15

$(TiO_2)_{1.4}(SnO)_{0.665}(ZnO)(WO_3)_{0.25}$

The procedure of Example 1 is repeated with the amounts of raw materials given in Table 15, where also the results of the coloristic tests of the obtained pigment are shown.

TABLE 15

| Initial mass (g) | | | | Molar ratio | | | | Mass tone | | |
| --- | --- | --- | --- | --- | --- | --- | --- | --- | --- | --- |
| TiO$_2$ | SnO | ZnO | H$_2$WO$_4$ | TiO$_2$ | SnO | ZnO | WO$_3$ | h* | C* | L* |
| 20.69 | 16.57 | 15.05 | 12.68 | 1.4 | 0.665 | 1 | 0.275 | 47.02 | 58.63 | 41.83 |

Example 16

$(TiO_2)_{1.6}(SnO)_{0.892}(WO_3)_{0.25}(ZnO)(SiO_2)$ 22.30 g of TiO$_2$, 17.63 g of SnO, 1.87 g of H$_2$WO$_4$, 14.20 g of ZnO and 0.652 g of SiO$_2$ are weighed into a beaker, well premixed with a spatula, then transferred into a 250 ml plastic bottle filled with 250 g of steatite beads (diameter: 10 mm). The premixed material is then mixed in dry form in an intensive mixer (Skandex) for 2 min. The crude mixture is transferred to a quartz flask and then heated to 875° C. under nitrogen (20 l/h) within 1 hour and then calcined for 1 hour. The furnace clinker is ground as described above in a porcelain vibratory mill. After drying and deagglomeration, the plastisol pigmentations are prepared and subjected to colorimetry. Table 16 shows the amounts of the raw materials employed and the results of the coloristic tests.

TABLE 16

| Molar ratio | | | | | Mass tone | | |
| --- | --- | --- | --- | --- | --- | --- | --- |
| TiO$_2$ | SnO | ZnO | WO$_3$ | SiO$_2$ | h* | C* | L* |
| 1.6 | 0.75 | 1 | 0.25 | 1 | 45.12 | 54.54 | 36.72 |

Example 17

$(TiO_2)_{1.8}(SnO)_{0.86}(ZnO)(WO_3)_{0.14}$ 29.07 g of TiO$_2$ doped with 20 mol % of tungsten, 21.13 g of SnO and 14.80 g of ZnO are weighed into a beaker, well premixed with a spatula, then transferred into a 250 ml plastic bottle filled with 250 g of steatite beads (diameter 9 mm). The premixed material is then mixed in dry form in an intensive mixer (Skandex) for 2 min. The crude mixture is transferred to a quartz flask and then heated to 800° C. under nitrogen (20 l/h) within 1 hour and then calcined for 1 hour. The furnace clinker is ground as described above in a porcelain vibratory mill. After drying and deagglomeration, the plastisol pigmentations are prepared and subjected to colorimetry. Table 17 shows the amounts of the raw materials employed and the results of the coloristic tests.

TABLE 17

| Initial mass (g) | | | Molar ratio | | | | Mass tone | | |
| --- | --- | --- | --- | --- | --- | --- | --- | --- | --- |
| TiO$_2$—W | SnO | ZnO | TiO$_2$ | SnO | ZnO | WO$_3$ | h* | C* | L* |
| 29.07 | 21.13 | 14.80 | 1.6 | 0.86 | 1.0 | 0.138 | 55.46 | 71.0 | 50.13 |

Example 18

$(TiO_2)_{1.6}(SnO)_{0.94}(ZnO)_{0.75}(WO_3)_{0.25}(K_2O)_{0.05}$ 21.79 g of TiO$_2$, 21.59 g of SnO, 10.63 g of H$_2$WO$_4$, 10.63 g of ZnO and 0.59 g of K$_2$CO$_3$ are weighed into a beaker, well premixed with a spatula, then transferred into a 250 ml plastic bottle filled with 250 g of steatite beads (diameter 9 mm). The premixed material is then mixed in dry form in an intensive mixer (Skandex) for 2 min. The crude mixture is transferred to the quartz flask and then heated to 800° C. under nitrogen (20 l/h) within 1 hour and then calcined for 1 hour. The furnace clinker is ground as described above in a porcelain vibratory mill. After drying and deagglomeration, the plastisol pigmentations are prepared and subjected to colorimetry. Table 18 shows the amounts of the raw materials employed and the results of the coloristic tests.

TABLE 18

| Initial mass (g) | | | | | Molar ratio | | | | | Mass tone | | |
| --- | --- | --- | --- | --- | --- | --- | --- | --- | --- | --- | --- | --- |
| TiO$_2$ | SnO | ZnO | H$_2$WO$_4$ | K$_2$CO$_3$ | TiO$_2$ | SnO | ZnO | WO$_3$ | K$_2$O | h* | C* | L* |
| 21.79 | 21.59 | 10.40 | 10.63 | 0.59 | 1.6 | 0.94 | 0.75 | 0.25 | 0.05 | 52.48 | 73.84 | 45.7 |

Example 19

$(TiO_2)_{1.6}(SnO)_{0.84}(SnO_2)_{0.1}(ZnO)_{0.75}(WO_3)_{0.25}(K_2O)_{0.05}$ 21.70 g of TiO$_2$, 19.21 g of SnO, 2.56 g of SnO$_2$, 10.58 g of ZnO, 10.63 g of H$_2$WO$_4$, and 0.59 g of K$_2$CO$_3$ are weighed into a beaker, well premixed with a spatula, then transferred into a 250 ml plastic bottle filled with 250 g of steatite beads (diameter: 9 mm). The premixed material is then mixed in dry form in an intensive mixer (Skandex) for 10 min. The crude mixture is transferred to the quartz flask and then heated to 800° C. under nitrogen (20 l/h) within 1 hour and then calcined for 1 hour. The furnace clinker is ground as described above in a porcelain vibratory mill. After drying and deagglomeration, the plastisol pigmentations are prepared and subjected to colorimetry. Table 19 shows the amounts of the raw materials employed and the results of the coloristic tests.

TABLE 19

| Initial mass (g) | | | | | | Mass tone | | |
|---|---|---|---|---|---|---|---|---|
| TiO$_2$ | SnO | SnO$_2$ | ZnO | H$_2$WO$_4$ | K$_2$CO$_3$ | h* | C* | L* |
| 21.70 | 19.21 | 2.56 | 10.58 | 10.63 | 0.59 | 52.39 | 71.81 | 46.98 |

The invention claimed is:

1. A pigment comprising titanium oxide, tin oxide, zinc oxide and tungsten oxide, wherein the molar ratios of the oxides correspond to a composition of formula $$(TiO_2)_a(SnO_x)_b(ZnO)_c(WO_3)_d \quad (I),$$ wherein SnO$_x$ comprises SnO and SnO$_2$ in a molar ratio of SnO:SnO$_2$ of from 0.7:0.3 to 1:0;
0.8≤a≤3.0;
0.3≤b≤2.0;
0.3≤c≤1.3; and
0.01≤d≤0.8.

2. The pigment according to claim 1, wherein ZnO is partially replaced by ZnS and the molar ratio of ZnO to ZnS is in the range of from 1.25:0.05 to 1.0:0.3.

3. The pigment according to claim 1, wherein the pigment comprises a sulfide of Sn, Ca, Ba or Mn.

4. The pigment according to claim 1, wherein 0.1≤d≤0.5.

5. The pigment according to claim 1, wherein the molar ratio of SnO:SnO$_2$ in SnO$_x$ is of from 0.75:0.25 to 0.98:0.02.

6. The pigment according to claim 1, wherein the molar ratio of SnO:SnO$_2$ in SnO$_x$ is of from 0.8:0.2 to 0.9:0.1.

7. The pigment according to claim 1, wherein the pigment is coated with at least one layer.

8. The pigment according to claim 7, wherein the said at least one layer is an inorganic layer.

9. The pigment according to claim 1, wherein pigment has a hue less than 57 (measured according to the CIELAB system).

10. The pigment according to claim 1, wherein pigment has a hue less than 51 (measured according to the CIELAB system).

11. A pigment mixture comprising
   a) 1% to 90% by weight of the pigment as defined in claims 1, and
   b) 10% to 99% by weight of one or more further pigments selected from the group consisting of an organic pigment, an inorganic pigment and an effect pigment.

12. A process for coloring a material which comprises utilizing the pigment according to claim 1 wherein the process is selected from the group consisting of a process for coloring
   a paint,
   a printing ink,
   a liquid ink,
   a cosmetic,
   a plastics,
   a film, a fiber, and
   a glaze for ceramics or glass.

13. A process for coloring a material which comprises utilizing the pigment mixture according to claim 11 wherein the process is selected from the group consisting of a process for coloring
   a paint,
   a printing ink,
   a liquid ink,
   a cosmetic,
   a plastics,
   a film, a fiber, and
   a glaze for ceramics or glass.

14. Paints, printing inks, liquid inks, cosmetics, plastics, films, fibers, or glazes for ceramics and glass, which are colored with the pigment according to claim 1.

15. Paints, printing inks, liquid inks, cosmetics, plastics, films, fibers, or glazes for ceramics and glass, which are colored with the pigment mixture according to claim 11.

16. A pigment comprising titanium oxide, tin oxide, zinc oxide and tungsten oxide, wherein the molar ratios of the oxides correspond to a composition of formula $$(TiO_2)_a(SnO_x)_b(ZnO)_c(WO_3)_d(E_yO_z)_e \quad (II),$$ wherein SnO$_x$ comprises SnO and SnO$_2$ in a molar ratio of SnO:SnO$_2$ of from 0.7:0.3 to 1:0;
E$_y$O$_z$ is an oxide of an element selected from Na, K, Rb, Cs, Mg, Ca, Sr, Ba, Al, Ga, In, Si, Ge, Sb, Bi, Zr, Hf, V, Nb, Ta, Mo, Cr, Mn, Fe, Co, Ni, Cu, Y, La, Ce, Eu or a combination thereof;
SnO$_x$ and/or ZnO may be partially replaced by the corresponding sulfide;
E$_y$O$_z$ may be replaced by E$_y$S$_z$;
y varies from 1 to 2; z varies from 1 to 5;
0.8≤a≤3.0;
0.3≤b≤2.0;
0.3≤c≤1.3;
0.01≤d≤0.8; and
0≤e≤0.5.

17. The pigment according to claim 16, wherein
1.1≤a≤2.4; 0.5≤b≤1.5; 0.4≤c≤1.1; 0.1≤d≤0.6; and 0≤e≤0.3.

18. The pigment according to claim 16, wherein E$_y$O$_z$ is an oxide of K, Mg, Ca, Sr, Ba, Al, Si, Bi, V, Nb, Ta, Mn or a combination thereof.

19. The pigment according to claim 16, wherein 0.4≤c≤0.7 and 0.01≤e≤0.3.

20. The pigment according to claim 16, wherein pigment has a hue less than 57 (measured according to the CIELAB system).

21. A process for producing the pigment as defined in claim 16, which process comprises
   a) mixing TiO$_2$, ZnO, SnO, WO$_3$, or a precursor compound thereof, and optionally at least one compound selected from E$_y$O$_z$, SnS, ZnS or E$_y$S$_z$, or a precursor compound thereof as a dry powder to form a powder mixture;
   b) calcining the powder mixture at a temperature of from 600 to 950° C. to form a furnace clinker;
   c) grinding the furnace clinker to form pigment particles; and
   d) optionally coating the pigment particles with at least one layer.

22. The process according to claim 21, wherein the calcining temperature is of from 700 to 875° C.

* * * * *